United States Patent
Billingham et al.

(10) Patent No.: US 7,018,444 B2
(45) Date of Patent: Mar. 28, 2006

(54) PROCESS FOR CARBON DIOXIDE RECOVERY FROM A PROCESS TOOL

(75) Inventors: John Frederic Billingham, Getzville, NY (US); Thomas John Bergman, Jr., Clarence Center, NY (US); Richard Martin Kelly, Buffalo, NY (US); Kenneth Leroy Burgers, East Amherst, NY (US); William Thoru Kobayashi, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 243 days.

(21) Appl. No.: 10/430,349

(22) Filed: May 7, 2003

(65) Prior Publication Data

US 2004/0222152 A1 Nov. 11, 2004

(51) Int. Cl.
*B01D 53/00* (2006.01)

(52) U.S. Cl. .................................. 95/14; 95/26; 95/243; 95/247; 95/258; 134/10; 134/902

(58) Field of Classification Search ................ 95/14, 95/19, 23, 26, 241, 243, 247, 258; 96/193, 96/218, 219; 134/10, 902, 108–111; 210/167, 210/180, 188, 639, 805; 451/60, 446; 423/437.1
See application file for complete search history.

(56) References Cited

U.S. PATENT DOCUMENTS

| 4,349,415 | A |   | 9/1982  | DeFillippi et al. ............ 203/14 |
| 4,877,530 | A |   | 10/1989 | Moses ......................... 210/511 |
| 5,377,705 | A | * | 1/1995  | Smith et al. ................ 134/95.3 |
| 5,849,104 | A | * | 12/1998 | Mohindra et al. .......... 134/25.4 |
| 6,558,475 | B1 | * | 5/2003 | Jur et al. ....................... 134/21 |
| 6,612,317 | B1 |   | 9/2003 | Constantini et al. ...... 134/58 R |
| 2001/0050096 | A1 |   | 12/2001 | Costantini et al. |
| 2002/0023662 | A1 |   | 2/2002 | Summerfield et al. |
| 2003/0161780 | A1 | * | 8/2003 | Howard et al. |

FOREIGN PATENT DOCUMENTS

WO    02085528    10/2002

\* cited by examiner

*Primary Examiner*—Joseph Drodge
(74) *Attorney, Agent, or Firm*—Turie A. Schwartz (57) ABSTRACT

A system for removing and purifying a carbon dioxide-containing stream from a batch process tool is provided. A multi-phase contaminated stream containing at least carbon dioxide and one or more co-solvent is removed from a process tool and conveyed to at least one intermediate pressure separator. The contaminant-containing stream is separated into an intermediate pressure carbon dioxide-enriched vapor stream and an intermediate pressure solvent and contaminant-enriched stream in the intermediate pressure separator.

25 Claims, 2 Drawing Sheets

PROCESS FOR CARBON DIOXIDE RECOVERY FROM A PROCESS TOOL

BACKGROUND OF THE INVENTION

1. Field of the Invention

The present invention relates to a process and system for the recovery of carbon dioxide from a carbon dioxide, co-solvent and contaminant stream emitted from one or more process tools which are operated in a discontinuous manner.

2. Description of Related Art

Carbon dioxide ($CO_2$) based systems have become increasingly important in the electronics industry, particularly in the fabrication of semiconductor components. $CO_2$ based systems may be utilized in numerous operations including chemical fluid deposition, photoresist deposition and photoresist development and removal. For example, supercritical $CO_2$ may be utilized to remove photoresist (i.e., contaminant) from semiconductor wafers.

A wafer having a contaminant on the surface thereof is placed in one of several cleaning chambers that includes a process tool. Carbon dioxide and one or more co-solvents, such as water or acetone, are injected into this chamber and the wafer is cleaned. During at least part of this cleaning process, the chamber temperature and pressure meet or exceed the supercritical temperature and pressure of carbon dioxide. Carbon dioxide, co-solvents and contaminant are then exhausted from the chamber such that the chamber pressure is reduced to ambient. To minimize the amount of carbon dioxide and co-solvent lost when the process tool depressurizes, the valve that allows the carbon dioxide, co-solvent and contaminant-containing stream to leave the process tool is located as close to the process tool as possible. The clean wafer is then removed from the chamber.

Typically carbon dioxide, co-solvent and contaminant-containing streams which are exhausted from the process tool need to be scrubbed of any co-solvent and contaminant before they are vented to the atmosphere because these substances may be hazardous. Further, it is sometimes desirable to purify and recycle at least a portion of the carbon dioxide contained in the exhaust stream to minimize $CO_2$ consumption and overall cost.

Several carbon dioxide recovery systems have been proposed in the related art. For example, U.S. Pat. Nos. 4,349,415 and 4,877,530 disclose processes in which the carbon dioxide application (i.e., the process tool) operates at a constant pressure that exceeds the triple point of carbon dioxide. In these disclosures, carbon dioxide is employed in a continuous extractor to remove an extract from a raffinate, forming extract- and raffinate-enriched streams. The extract-enriched stream contains most of the carbon dioxide and passes continuously to purification and recycle means. The raffinate-enriched stream also contains a small amount of carbon dioxide and is sent to a phase separator, which produces further enriched raffinate-containing liquid and carbon dioxide-enriched vapor streams. The carbon dioxide-enriched vapor stream is sent to a holding tank to dampen any fluctuations in flow and is then compressed and recycled.

Since the processes described in U.S. Pat. Nos. 4,349,415 and 4,877,530 operate continuously, the extractor pressure is never reduced to ambient levels. Therefore, the phase separator may operate at any pressure that would accommodate downstream processes. It is desirable to operate the phase separator at a pressure that exceeds ambient pressure so that the carbon dioxide-enriched vapor stream may be transferred to other equipment, such as the holding tank, without first compressing this stream. Operating the phase separator at a pressure in excess of ambient pressure would also reduce the required holding tank volume and compression power.

If the process application (i.e. the extractor) described by U.S. Pat. Nos. 4,349,415 and 4,877,530 were operated in batch, as described in other related art, several problems would result. The process application pressure would likely need to be reduced to ambient level during its operation. This would necessitate operating the separator at ambient pressure. Therefore, compression would be required to transfer the carbon dioxide-enriched vapor stream to other equipment, such as the holding tank. Alternatively, the separator could be operated at a pressure in excess of ambient pressure. This would necessitate sending any vapor that remains in the extractor below the separator operating pressure to vent as a vent stream. This vent stream would exist as a multi-phase stream, likely as some combination of vapor, liquid and solid. Transfer of this multi-phase stream to vent would be very difficult and would have a deleterious effect on downstream equipment due to, for example, solid and liquid deposition. It is possible to compress the vent stream so that it may be sent to the separator. However, this would require the use of further compression equipment, resulting in significant cost increase. Further, since the carbon dioxide application disclosed in these patents is continuous, maintaining constant flow to the downstream processes is not a concern.

International Patent Document WO 02/085528 describes a process that employs a single separator vessel which operates at a wide range of pressures for upgrading and recycling liquid or supercritical carbon dioxide leaving a carbon dioxide application. The vessel, which is referred to as an expander-concentrator, operates in batch mode. Liquid leaving the carbon dioxide application is pumped and then sent to a high-pressure liquid holding tank. Liquid taken from this holding tank is routed to the expander-concentrator, which is physically located within the holding tank.

When the liquid level in the expander-concentrator reaches the desired value, its feed is discontinued. The pressure associated with the expander-concentrator is then gradually reduced, generating a vapor stream that initially contains high levels of co-solvent and contaminant but becomes co-solvent and contaminant-free as the expander-concentrator pressure is reduced. When the co-solvent and contaminant level associated with the vapor stream falls to acceptable levels, the vapor stream is released and recycled.

Since the expander-concentrator operates in batch mode, a continuous vapor stream is not generated, which may be deleterious to downstream equipment. Other deleterious effects of this phase-separation system include high cost due to use of specialized equipment and difficult design of the compressive/pumping device, especially if corrosive substances are present. Finally, it is difficult to transfer the carbon dioxide, co-solvent and contaminant-containing stream leaving the carbon dioxide application to the holding tank using a pump since this stream changes from liquid phase to multi-phase to vapor phase as the carbon dioxide application depressurizes. Moreover, as the expander-concentrator pressure approaches ambient pressure, vapor carbon dioxide leaving the phase-separator requires further compression means, which are resistant to the corrosive elements entrained therein.

Finally, the related art describes the use of multiple phase-separators to separate carbon dioxide from the carbon dioxide, co-solvent and contaminant-containing stream leaving a carbon dioxide application. U.S. patent application Ser. No. 2001/0050096 describes such a process. In the process described therein, the pressure associated with the carbon dioxide, co-solvent and contaminant-containing stream leaving a process tool is decreased. The resulting intermediate pressure stream is sent to a heated, intermediate-pressure phase separator, which generates a carbon dioxide-enriched vapor stream and a co-solvent and contaminant-enriched liquid stream. The carbon dioxide-enriched vapor stream is filtered and sent to a first condenser from which substances with a higher vapor pressure than carbon dioxide are vented. The co-solvent and contaminant-enriched liquid stream leaving the intermediate-pressure phase separator is depressurized to somewhat greater than ambient pressure and sent to a low-pressure separator, which generates a co-solvent-enriched vapor stream and a contaminant-enriched liquid stream. The co-solvent-enriched vapor stream is sent to a second condenser, where substances more volatile than co-solvent are vented. The contaminant-enriched liquid stream leaving the low-pressure phase separator is collected for disposal.

One of the disadvantages associated with the multiple phase-separators of U.S. patent application Ser. No. 2001/0050096 is that the intermediate-phase separator and most operations located downstream of it are designed to operate continuously. To ensure continuous operation, carbon dioxide bypasses the tool and is fed to the intermediate-pressure phase separator when carbon dioxide, co-solvent and contaminant-containing fluid is not discharged from the process tool. This represents a process inefficiency, since power expended to pressurize carbon dioxide that is normally fed to the process tool is discarded upon bypass.

Further, as the intermediate-pressure phase separator operates continuously, its pressure cannot be reduced to near ambient. Therefore, the process tool pressure cannot be reduced to ambient by discharging its contents into this separator. To reduce the process tool pressure to ambient, fluid existing at a pressure equal to and less than that associated with the intermediate-pressure phase separator is discharged to another vessel that is independent of all previously mentioned vessels. This vessel is heated to completely vaporize all substances that enter it. The resulting vapor is sent to a vent scrubbing system. It is likely that this vessel will need to be heated to greater than ambient temperature to completely vaporize its contents, since some co-solvents and contaminants will have a very low vapor pressure. As the vapor leaving this vessel is transferred to the vent scrubbing system, it will cool due to heat leak. As a result, these very low vapor pressure substances will re-condense and deposit on process piping, creating the multi-phase flow issues described above. These deleterious effects are exacerbated if the co-solvents are corrosive.

An additional disadvantage associated with this process is that the carbon dioxide-enriched vapor leaving the intermediate pressure phase-separator and ultimately recycled to the process tool is likely to have a significant co-solvent/contaminant level associated therewith, since the vapor pressure associated with these substances is not insignificant. Therefore, the process tool may be contaminated. Further, if corrosive co-solvents are employed, they may damage the compressors or pumps that pressurize the recycled carbon dioxide downstream of the first condenser.

U.S. patent application Ser. No. 2002/0023662 describes a process that uses multiple distillation columns to separate a solvent and contaminant-containing stream leaving an extraction application. As described therein, the extraction application is contaminant removal from solid adsorbents, such as clays. Supercritical carbon dioxide is listed as a potential solvent. Solvent and contaminant-containing liquid leaving the extractor is sent to a holding tank to eliminate fluctuations in flow caused by batch extractor operation. Liquid is pumped from this holding tank and sent to a first distillation column, which produces a first solvent-enriched stream and a first contaminant-enriched stream. The first solvent-enriched stream is recycled to the extractor without further purification. Therefore, a multi-staged distillation column is required. Distillation columns require a continuous feed, necessitating the holding tank. Further, pure liquid solvent must be fed to the top of the column because the column is reboiled. Since the solvent and contaminant-containing stream is not pure liquid solvent, some of the product solvent stream must be condensed and recycled to the column, resulting in poor efficiency.

The first contaminant-enriched stream is sent to a second separation distillation column that produces a second solvent enriched stream and an essentially pure contaminant stream. A distillation column is required, since the contaminant is a desired product. The solvent enriched stream is condensed, pumped and recycled to the first separation means. The essentially pure contaminant stream is collected for disposal or re-use.

A further disadvantage associated with this system is that the holding tank pressure can not be reduced to near ambient, since carbon dioxide does not exist as a liquid near ambient pressure. Therefore, the extractor pressure cannot be reduced to ambient by discharging its contents into the holding tank. To reduce the extractor pressure to ambient, fluid contained in the extractor at pressures equal to and less that that associated with the holding tank is discharged to the second distillation column. This presents significant operational concerns, since such columns separate poorly, if at all, with a discontinuous feed. Further, if the solvent is supercritical carbon dioxide, the second distillation column will not function well, since carbon dioxide can not exist in the liquid phase at ambient pressure. Carbon dioxide is likely to exist as a solid in the second column, which is likely to cause the column to plug.

If the first distillation column were replaced by a phase separator, a further disadvantage would be that the carbon dioxide-enriched vapor leaving this phase separator would contain high levels of contaminant since the vapor pressure associated with these substances is not insignificant. Since further separation means are not employed, the extractor would be contaminated. Further, if corrosive co-solvents are employed, they may damage compressors or pumps that pressurize the recycled carbon dioxide. Therefore, the use of phase separators is unacceptable.

To overcome the disadvantages of the related art, it is an object of the present invention to provide a process and system for the recovery of carbon dioxide from a discontinuous carbon dioxide stream emitted from at least one batch process tool.

Another object of the invention is to allow the process tool to vent to ambient pressure.

A further object of the invention is to transfer streams containing corrosive, toxic or hazardous substances such as acids or bases to further purification and/or vent-scrubbing systems.

Yet another object of the invention is to dampen process condition fluctuations associated with the feed to the further purification systems while the process tool is operating.

Other objects and aspects of the present invention will become apparent to one of ordinary skill in the art on a review of the specification, the drawings and claims appended hereto.

SUMMARY OF THE INVENTION

The foregoing objectives are met by the system and process of the present invention. According to a first aspect of the invention, a system for purifying at least one carbon dioxide-containing stream from at least one batch process tool is provided. The system includes:

(a) removing at least one contaminated stream containing at least carbon dioxide, one or more co-solvents and one or more contaminants from at least one batch process tool and reducing the pressure of each contaminated stream producing multi-phase contaminated streams;

(b) conveying each multi-phase contaminated stream to at least one intermediate pressure separator;

(c) separating the multi-phase contaminated streams into intermediate pressure carbon dioxide-enriched streams containing primarily vapor solvent and contaminant-enriched streams containing primarily in each intermediate pressure separator;

(d) switching conveyance of the multi-phase contaminated stream to a low pressure separator; and (e) separating the multi-phase contaminated streams of step (d) into a low pressure carbon dioxide enriched stream and a low pressure solvent and contaminant enriched stream in the low pressure separator.

According to another aspect of the invention, a system for purifying at least one carbon dioxide-containing stream from at least one batch process tool is provided.

The system includes:

(a) supplying one or more first co-solvents and purified carbon dioxide to one or more process tools, and forming first contaminated streams in each process tools;

(b) conveying each first contaminated stream in multi-phase form to at least one first intermediate or low pressure separator, wherein the first contaminated streams are separated;

(c) supplying one or more second co-solvents and purified carbon dioxide to the process tools, forming second contaminated streams in the process tools; and (d) conveying each second contaminated stream in multi-phase form to at least one second intermediate or low pressure separator, wherein the second contaminated streams are separated.

BRIEF DESCRIPTION OF THE DRAWINGS

The objects and advantages of the invention will become apparent from the following detailed description of the preferred embodiments thereof in connection with the accompanying drawings, in which like numerals denote same features, and in which.

DETAILED DESCRIPTION OF THE PREFERRED EMBODIMENTS OF THE INVENTION

In the present invention, carbon dioxide-containing streams are removed from one or more processing tools containing one or more processing chambers. The processing tools are operated in a discontinuous or batch-wise manner, releasing the pressure in the chambers to ambient conditions. The contaminant-containing streams removed from the processing tools are conveyed to one or more pressure vessels where the streams are separated into carbon dioxide vapor streams and liquid contaminant-containing streams. In particular, the carbon dioxide-containing streams exiting the tools are processed in accordance with the following non-limiting embodiments and may be recycled back to the processing chambers for further use.

Figure 1:
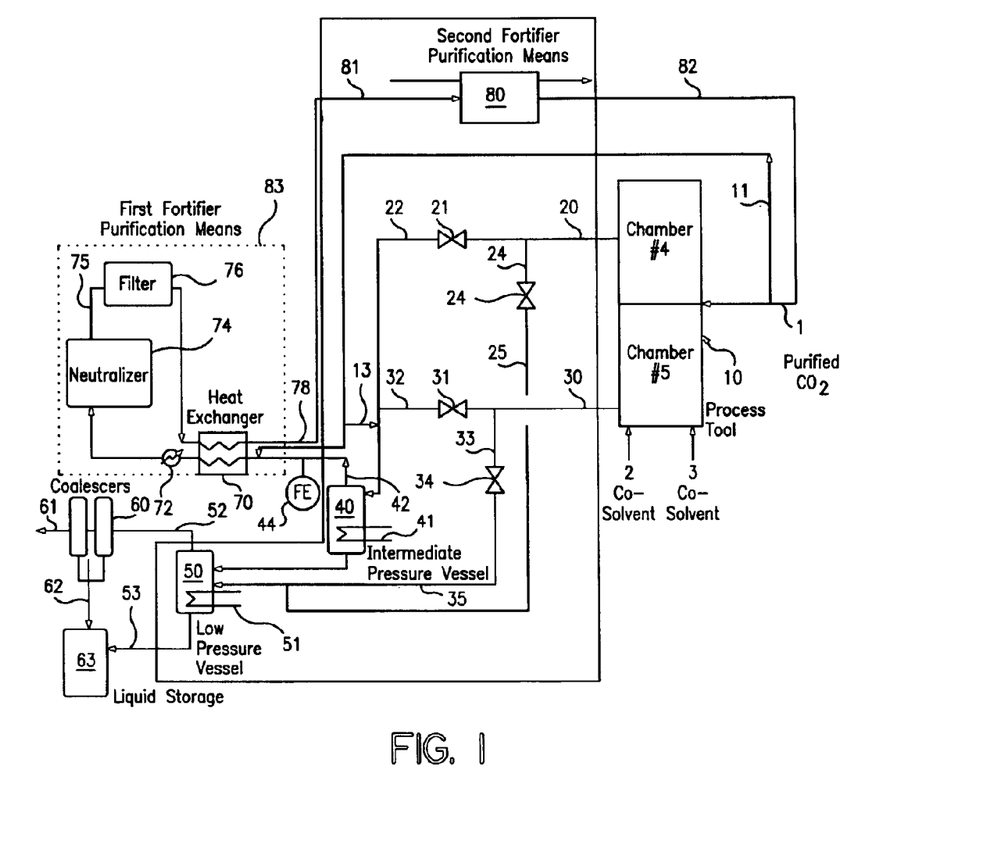
FIG. 1 is a schematic diagram of a carbon dioxide recovery system, in accordance with a first embodiment of the invention.

FIG. 1 illustrates a schematic diagram of a processing system in accordance with one aspect of the invention. A purified carbon dioxide stream 1 and one or more co-solvents 2 and 3 are conveyed to process tool 10. It will be recognized that process tool 10 may include one or more chambers 4,5 which can operate independent of one another. The tool is operated such that the carbon dioxide stream becomes near-critical, critical or supercritical during at least part of its operating time. As used here, the terms critical and supercritical carbon dioxide will be readily recognized by those skilled as having a temperature and pressure equal to or greater than the supercritical temperature and pressure of $CO_2$, typically 87.8° F. and 1085 psia, respectively. Near-critical carbon dioxide exists at a temperature between −49° F. and 87.8° F. and a pressure greater than or equal to 1085 psia. See Supercritical Fluid Cleaning Fundamentals Technology and Applications by John McHandy et al., Noyes Publications, Copyright, 1998. The carbon dioxide and the co-solvents combine therein to perform one of any number of operations including photoresist removal. These co-solvents may be selected from an extensive group, including water and acetone. Thus, the effluent exiting process tool 10 is a carbon dioxide, co-solvent and contaminant (e.g., non-volatile substances, such as photoresist).

The streams 20,30 exiting chambers 4 and 5, respectively are initially at the process tool operating pressure. Naturally, the operating pressure and temperature is dependent on the operation carried out. Suitable maximum operating pressure ranges for the process tool is about 800 to 5000 psig. Suitable operating temperature range is about −50 to 300° F. Streams 20,30 are flashed across high-pressure valves 21,31 to depressurize the process chambers to a lower pressure, typically 200–800 psig. While not wanting to be bound by any particular theory it is believed that at supercritical conditions the streams exiting the process chambers may or may not exist as a single-phase mixture. However, as the streams exit the process tool, and are throttled to low pressure, the streams become multi-phase. Typically the multi-phase stream contains vapor, liquid and solid components. The presence of multiple phases could result in pipe, instrument or process equipment fouling and/or could produce undesirable flow characteristics (i.e., slug or stratified flow). These undesirable flow conditions would damage the downstream equipment including vent scrubbing systems. Furthermore, the corrosive nature of the multi-phase stream would likewise contribute to the deleterious effect on downstream equipment. Each resulting lower pressure carbon dioxide, co-solvent and contaminant containing stream 22,32 downstream of the high-pressure valves is routed to intermediate pressure separator 40, while the pressure of the source streams 20,30 at their process chamber 4,5 exceed the pressure associated with separator 40 by more than a predetermined value. Preferably, the predetermined pressure difference is about 0 to about 50 psig. Most preferably, the predetermined pressure value is about 2 psig.

Intermediate pressure separator 40 is utilized to separate the carbon dioxide, co-solvent and contaminant-containing streams 20,30 exiting process tool 10 into an intermediate pressure carbon dioxide-enriched vapor stream 42 and an intermediate pressure co-solvent and contaminant-enriched liquid stream 43. As utilized herein, the terms vapor stream and liquid stream will be readily recognized by those skilled in the art to mean at least 50 percent by mass vapor and liquid phase, respectively. Further, it will be understood that pressure separator 40 may be a single phase separator or multi-staged separator capable of separating the multi-phase streams. An example of a multi-staged separator would be a reflux condenser.

The amount of carbon dioxide relinquished into the contaminant liquid stream 43 can be controlled by heating the intermediate pressure phase separator 40 to a temperature typically ranging from about −100° F. and 200° F. Preferably, the separator operating temperature would be 32° F. to 120° F. Most preferably the separator generating temperature would be 50° F. to 120° F. Further, the pressure associated with the intermediate phase separator 40 is selected such that the intermediate pressure carbon dioxide-enriched vapor stream 42 can be routed to a further purification means 80,83 without the need to compress vapor stream 42 exiting intermediate separator 40. Typically the intermediate separator 40 is operated at a pressure ranging from about 200–900 psig, and more preferably about 250–450 psig.

The pressure in process chambers 4,5 diminishes as the process tool returns to ambient pressure, and therefore, the pressure of source streams 20,30 conveyed to intermediate separator 40 drops. As the pressure difference between streams 20,30 and the intermediate pressure separator 40 reaches the predetermined value (e.g., 2 psig), high pressure valves 21,31 close and low-pressure valves 24,34 open. The lower pressure carbon-dioxide, co-solvent and contaminant-containing streams 25,35 are routed to low-pressure separator 50, which generates a low-pressure co-solvent and contaminant-enriched liquid stream 53 and a low-pressure carbon dioxide-enriched vapor stream 52. Low-pressure separator 50 typically operates at approximately ambient pressure so that the process tool can fully depressurize. The amount of carbon dioxide relinquished into the contaminant liquid 53 can be controlled by heating the low pressure phase separator 50 to a temperature typically ranging from about −100° F. to 200° F. Preferably, the separator operating temperature would be 32° F. to 120° F. Most preferably the separator operating temperature would be 50° F. to 120° F. The low-pressure co-solvent and contaminant-enriched liquid stream 53 exiting the low-pressure separator 50 may be conveyed to waste, such as collection drum 63, and the low-pressure carbon dioxide-enriched vapor stream may be conveyed to a series of coalescers 60 where any aerosols that are entrained in the vapor stream are removed.

Although this preferred embodiment employs differential pressure as a basis for conveying the lower pressure carbon dioxide, co-solvent and contaminant stream 22,32 to the intermediate pressure separator or low pressure separator, other parameters may be employed. Examples of such alternative parameters include the pressure, temperature or flow associated with stream 22,23, and the pressure or temperature associated with the intermediate pressure separator or the process tool. The pressure, temperature or flow can be utilized to calculate a differential between the process tool and the intermediate separator. Alternatively, depressurization time or rate of pressure decay or rate of temperature increase in the process tool can be employed to determine whether to route stream 22,23 to the intermediate or low pressure separator. All of these calculations employ flow, temperature, pressure or time as a measured quantity, which is utilized to determine the appropriate switching point.

The aerosols captured in the coalescers 60 can be routed to waste collection drum 63 and the recovered vapor may be routed to a vent scrubbing system for further purification.

Preferably the intermediate pressure co-solvent and contaminant-enriched liquid stream 43 exiting the intermediate pressure separator 40 may be routed to the low pressure separator 50, which further separates the contaminant-enriched liquid stream 43 into a low pressure carbon dioxide-enriched vapor stream 52 and a low pressure co-solvent and contaminant-enriched liquid stream 53. The low pressure co-solvent and contaminant-enriched liquid stream 53 may be routed to a waste collection drum 63.

In accordance with one aspect of the invention, flow 44 associated with the intermediate pressure carbon dioxide-enriched vapor stream 42 is maintained at a relatively fixed value while the process tool is operating by manipulating a process parameter associated with this stream, such as pressure, temperature or flow. For example, a valve 45 placed in the intermediate pressure carbon dioxide-enriched vapor stream 42 may be manipulated to maintain a constant flow reading on a flow measuring device 44 located in this stream while the process tool is operating. In this manner, the intermediate pressure vessel 40 pressure will vary, but its outlet flow will remain fixed.

The intermediate pressure carbon dioxide-enriched vapor stream 42 exiting intermediate pressure separator 40 may be further purified to remove corrosive, toxic and hazardous substances, such as acids and bases, in the vapor stream to facilitate safe transfer to other equipment. Potential further purification means include, reaction, distillation, phase separator, filtration, adsorption, absorption or coalescence. For example, if acids are present, vapor stream 42 may be pre-heated utilizing heat exchanger 70 and optionally trim heater 72 prior to conveying vapor stream 42 to a reactor means 74. It will be recognized by those skilled in the art that conventional neutralization means which may be utilized with the present invention which include a bed of limestone or alumina.

Neutralized stream 75 exiting reactor means 74 is passed through filter 76 to remove particulates entrained in the stream. Subsequently, neutralized stream 75 is conveyed through heat exchanger 70 and cooled to a temperature typically ranging from about 50° F. to 200° F. The neutralized vapor stream may then be conveyed to a further purification means 80, which would remove any remaining substances, such as water, hydrocarbons and other contaminants that have a vapor pressure different from that associated with $CO_2$. Such further purification means are disclosed in "Central $CO_2$ Purifier" and "Recycle for Supercritical Carbon Dioxide" Application Ser. Nos. 10/274,303 and 10/274,302, incorporated herein by reference in their entirety. As demonstrated in these applications, the second further purification means 80 are versatile, so as to process carbon dioxide streams 81 from other tools and second further distribute carbon dioxide streams 82 to other process tools.

As the carbon dioxide stream 78 is further purified, an operation grade purified carbon dioxide stream 1 is formed and recycled back to process tool 10. Typically, the purified carbon dioxide stream 1 will contain less than 10 ppm impurities, most preferably less than 1 ppm impurities.

Process tool 10, as aforementioned, is operated in a batch or discontinuous manner. Therefore, the temperature and pressure of multi-phase streams 20,30 vary substantially. Many of the carbon dioxide purification and recycle system components, such as distillation columns, heat exchangers and switching bed adsorbent systems operate very poorly or do not function at all if the flow characteristics are not satisfactory. Process parameters and configuration associated with the further purification systems may be varied to maintain constant flow in that system. Alternatively, a bypass stream of operation grade purified carbon dioxide 11 may be removed off the recycle line and conveyed to the intermediate pressure separator 40, ensuring that the carbon dioxide-enriched vapor stream 42 is supplied to the purification units at a continuous manner. Optionally, bypass stream 11 may be conveyed directly to the carbon dioxide-enriched vapor stream 42, bypassing the intermediate pressure separator 40.

A further benefit of employing the bypass purified carbon dioxide stream 11 is that it provides a continuous flow and thereby prevents carbon dioxide from stagnating in the process tool feed line. Stagnant carbon dioxide could leach elastomers or other particles generating contaminants from the process line, causing them to concentrate and deposit in the process tool. Bypassed liquid carbon dioxide 11 could also be used to sweep and clean fouled lines downstream of the process tool, should such fouling occur.

If practical, chamber and/or tool operation could be timed to minimize the number of chambers and/or tools that are releasing contaminated streams simultaneously.

Figure 2:
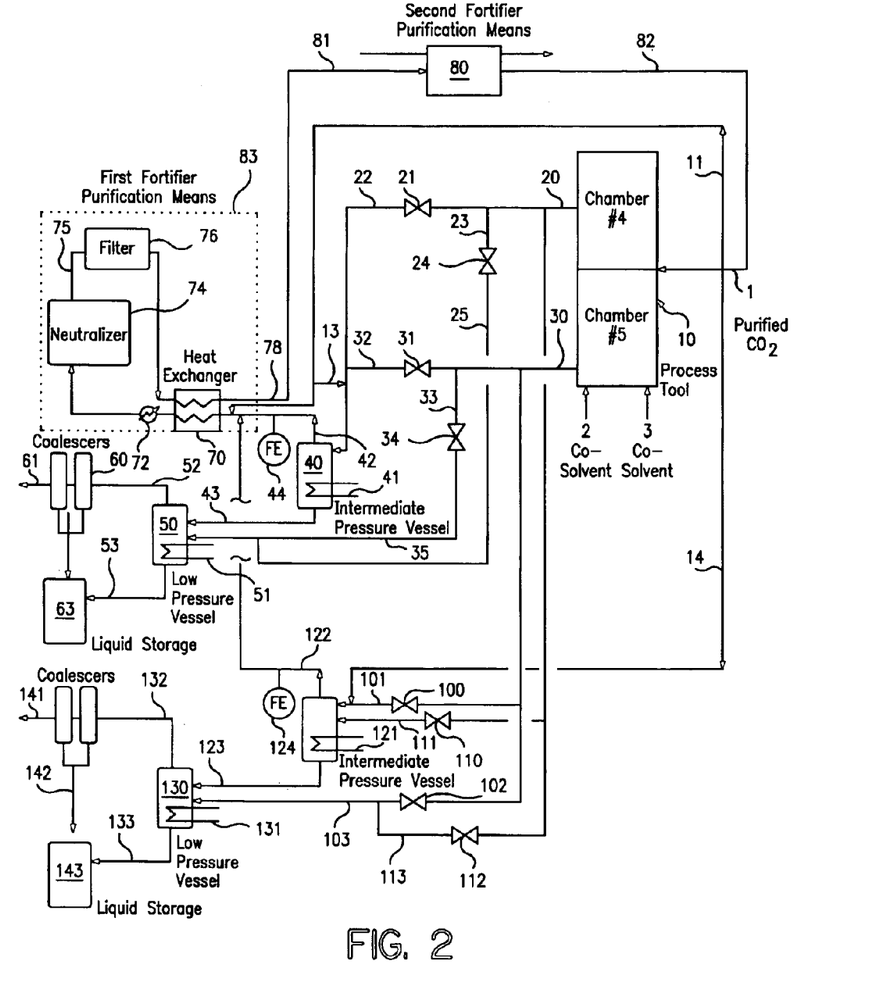
FIG. 2 is a schematic diagram of a carbon dioxide recovery system, in accordance with a second embodiment.

In accordance with another aspect of the invention, two systems are disclosed in parallel, wherein at least two separate co-solvent streams are added to the process tool sequentially along with purified carbon dioxide. Use of parallel separation system is advantageous if, for example, the co-solvents are to be collected and recycled or if the co-solvents used are incompatible with one another. With reference to FIG. 2, a first co-solvent 2 is added to the process tool 10 along with co-solvent and contaminant-free carbon dioxide stream 1. Contaminated streams 20,30 containing co-solvent 2 therein are conveyed to intermediate-pressure separator 40 and/or low-pressure separator 50, and processed as described above.

A second co-solvent 3 is subsequently added to the process tool 10 along with co-solvent and contaminant-free carbon dioxide stream 1.

Contaminated or source streams 20,30 containing co-solvent 3 therein are exhausted from the process tool. These streams are conveyed to a second intermediate-pressure separator 120 or second low-pressure separator 130. One of the advantages of this configuration is that the first co-solvent 2 may be collected in a waste collection drum 63 independent of the second co-solvent 3, which would be collected in a second waste collection drum 143. The contaminated streams 20,30 having co-solvent 2 therein are processed as described above, with reference to the first aspect of the invention.

As illustrated in FIG. 2, in this embodiment, the contaminant-containing streams 20,30 having second co-solvent 3 therein exit process tool 10. Initially streams 20,30 are at the process tool operating pressure, for example 2000 psig. The contaminant-containing streams are flashed across high-pressure valves 100,110 to depressurize the process tool 10.

The resulting multi-phase carbon dioxide, co-solvent and contaminant-containing streams 101,111 are conveyed to the second intermediate pressure separator 120, while the pressure of source streams 20,30, at the process chamber 4,5 exceeds the pressure associated with separator 120 by more than a predetermined amount. Preferably, the predetermined value is about 2 psig.

The second intermediate pressure separator 120 is employed to separate the contaminant-containing streams 20,30 exiting process tool 10 into an intermediate pressure carbon dioxide-enriched vapor stream 122 and an intermediate pressure co-solvent and contaminant-enriched liquid stream 123. This intermediate pressure separator 120 may include a heater 121 to deliver energy to the separator. In turn, the energy delivered to separator 120 controls the amount of carbon dioxide that is lost in the co-solvent and contaminant-enriched liquid stream 123.

The pressure associated with the intermediate pressure separator 120 is selected such that the intermediate pressure carbon dioxide-enriched vapor stream 122 from separator 120 may be purified by further purification means 80,83 without compressing the intermediate pressure carbon dioxide-enriched vapor stream 122. A typical pressure associated with the intermediate pressure separator is 300 psig.

As the pressure of contaminant-containing streams 20,30 diminish, the pressure of the streams at the process tool approach the pressure within second intermediate pressure separator 120. When the difference between these values reaches the predetermined value (for example, 2 psig), high pressure valves 100,110 close and low-pressure valves 102, 112 open. The resulting further lower pressure carbon dioxide, co-solvent and contaminant-containing streams 103,113 are conveyed to a second low-pressure separator 130.

The intermediate pressure co-solvent and contaminant-enriched liquid stream 123 exiting the second intermediate pressure separator 120 may also be routed to the second low pressure separator 130, which further separates the contaminant-enriched liquid stream into a low-pressure carbon dioxide-enriched vapor stream 132 and a low pressure co-solvent and contaminant liquid stream 133. The low-pressure co-solvent and contaminant-enriched liquid stream 133 may be routed to a waste collection drum 143.

The low-pressure carbon dioxide-enriched vapor stream 132 may be conveyed to a second series of coalescers 140 where aerosols are removed. Captured aerosols 142 may likewise be drained to waste collection drum 143. Vapor leaving the second coalescers 141 is conveyed to the vent scrubbing system.

If desired, flow 124 associated with the intermediate pressure carbon dioxide-enriched vapor stream 122 can be maintained at a relatively fixed value while the process tool operates by manipulating a process parameter associated with this stream, such as pressure, temperature or flow. For example, a valve (not shown) placed in the intermediate pressure carbon dioxide-enriched vapor stream 122 may be manipulated to maintain a constant flow reading on a flow measuring device 124 located in this stream. In this manner, the intermediate pressure vessel 120 pressure will vary, but its outlet flow will remain relatively fixed.

Further, constant flow may be maintained, if desired, by passing some of the purified carbon dioxide around the process tool 10. By-pass stream 14 may be conveyed to either the second intermediate-pressure separator 120 or to a point downstream of the intermediate separator 120 through stream 12, ensuring that the carbon dioxide-enriched vapor 122 is supplied in a continuous manner.

The intermediate pressure carbon dioxide-enriched vapor stream 122 may be joined with the carbon dioxide-enriched stream exiting first intermediate pressure separator 40 and further pretreated to remove, for example, corrosive, toxic and hazardous substances by passing this stream through a further purification means 83, and second further purification means 80, as described above. Alternatively, these streams may be combined after passing through their own separate first purification means but prior to the second purification means. If desired, the vapor stream 141 leaving the second coalescers 140 may be combined with the vapor stream 61 leaving the first coalescers.

While the invention has been described in detail with reference to specific embodiments thereof, it will be apparent to one skilled in the art that various changes and modifications can be made, and equivalents employed, without departing from the scope of the appended claims.

We claim:

1. A process for purifying at least one carbon dioxide-containing stream from a batch process tool, comprising:
    (a) removing at least one contaminated stream containing at least carbon dioxide, one or more co-solvents and one or more contaminants from said batch process tool, and reducing the pressure of said contaminated stream producing a multi-phase contaminated stream;
    (b) conveying said multi-phase contaminated stream to an intermediate pressure separator operating at a pressure between about 200–900 psig;
    (c) separating the multi-phase contaminated stream into an intermediate pressure carbon dioxide-enriched vapor stream and intermediate pressure solvent and contaminant-enriched stream in said intermediate pressure separator;
    (d) wherein the intermediate pressure solvent and contaminant-enriched stream is removed from said intermediate pressure separator and is conveyed to a low pressure separator; and
    (e) separating the solvent and contaminent enriched stream of step (d) into a low pressure carbon dioxide enriched vapor stream and a low pressure solvent and contaminant enriched stream in said low pressure separator operating at approximate ambient pressure.

2. The process according to claim 1, further comprising: switching the conveyance of said multi-phase contaminated stream from said intermediate pressure separator to said low pressure separator using a measurement selected from the group consisting of pressure, temperature, flow and time.

3. The process according to claim 1 in which said intermediate pressure solvent and contaminant-enriched stream is a liquid.

4. The process according to claim 1 in which said low pressure solvent and contaminant-enriched stream is a liquid.

5. The process according to claim 1, further comprising: providing at least one high pressure depressurizing valve, wherein said depressurizing valve is disposed in close proximity to the process tools, upstream of said intermediate pressure separator.

6. The process according to claim 1, further comprising: conveying the intermediate carbon dioxide-enriched vapor stream to a further purification system selected from the group consisting of distillation, phase separation, chemical reaction, filtration, absorption, adsorption and coalescence, to further remove contaminants and co-solvents having a vapor pressure different than carbon dioxide, forming a purified stream.

7. The process according to claim 6, wherein said further purification system removes contaminants that have a lower vapor pressure than carbon dioxide.

8. The process according to claim 6, wherein a portion of the purified carbon dioxide stream recovered from said further purification system is recycled to said process tool.

9. The process according to claim 6, wherein said further purification system removes contaminants selected from the group consisting of acids, bases, flammable, corrosive and toxic substances.

10. The process according to claim 1, wherein the low pressure carbon dioxide-enriched vapor stream recovered from said low pressure separator is conveyed to one or more coalescers or mist eliminators prior to conveying the low pressure carbon dioxide enriched vapor stream to a vent scrubbing system.

11. The process according to claim 1, wherein said process tool includes two or more independently operated chambers, each generating at least one contaminated carbon dioxide stream.

12. The process according to claim 11, wherein said second intermediate pressure co-solvent and contaminant-enriched stream is routed to a second low pressure separator.

13. The process according to claim 1, wherein said intermediate pressure separator includes a phase separator or multi-staged separation system.

14. A process for purifying at least one carbon dioxide containing stream from a batch process tool, comprising:
    (a) supplying one or more first co-solvents and purified carbon dioxide to a process tool, and forming a first contaminated stream in said process tool;
    (b) conveying said first contaminated stream in multi-phase form to a first intermediate or low pressure separator, wherein said first contaminated stream is separated into a carbon dioxide-enriched stream and a first co-solvent-enriched stream;
    (c) supplying a second co-solvent and purified carbon dioxide to said process tool, forming a second contaminated stream in said process tool; and
    (d) conveying said second contaminated stream in multi-phase form to a second intermediate or low pressure separator, wherein said second contaminated stream is separated into a carbon dioxide-enriched stream and a second co-solvent-enriched stream and e) separately collecting said first and second separated co-solvent-enriched streams.

15. The process according to claim 14, further comprising:
    one or more depressurizing valves in close proximity of the process tool, upstream of said first and second intermediate or low pressure separator.

16. The process according to claim 14, wherein the first contaminated stream is conveyed to a first intermediate pressure separator and separated into a first intermediate pressure carbon dioxide vapor stream and a first intermediate pressure co-solvent and contaminant enriched stream.

17. The process according to claim 16, wherein the conveyance of said first contaminated stream is switched from a first intermediate separator to a first low pressure separator.

18. The process according to claim 16, wherein said first intermediate pressure co-solvent and contaminant-enriched stream is routed to a first low pressure separator.

19. A process according to claim 14, wherein the second contaminated stream is conveyed to a second intermediate pressure separator and separated into a second intermediate pressure carbon dioxide vapor stream and a second intermediate pressure co-solvent and contaminant enriched stream.

20. The process according to claim 19, wherein the conveyance of said second contaminated stream is switched from a second intermediate separator to a second low pressure separator.

21. The process according to claim 14, wherein said first contaminated stream is routed to a first low pressure separator and separated into a first low pressure carbon dioxide-enriched vapor stream and a first low pressure co-solvent and contaminant enriched stream.

22. The process according to claim 14, wherein the second contaminated stream is routed to a second low pressure separator and separated into a low pressure carbon dioxide-enriched vapor stream and a low pressure co-solvent and contaminant-enriched stream.

23. The process according to claim 14, further comprising conveying at least one intermediate pressure carbon dioxide-enriched vapor stream to a further purification system selected from the group consisting of distillation, phase separation, chemical reaction, filtration, absorption, adsorption, and coalescence to further remove contaminants and co-solvents having a vapor pressure different than carbon dioxide, forming a purified stream.

24. The systenraccording to claim 23, wherein said further purification system removes contaminants that have a lower vapor pressure than carbon dioxide.

25. The process according to claim 23, wherein a portion of the purified carbon dioxide stream is recycled to the process tool.

* * * * *

UNITED STATES PATENT AND TRADEMARK OFFICE
CERTIFICATE OF CORRECTION

| | | |
|---|---|---|
| PATENT NO. | : 7,018,444 B2 | Page 1 of 1 |
| APPLICATION NO. | : 10/430349 | |
| DATED | : March 28, 2006 | |
| INVENTOR(S) | : Billingham et al. | |

It is certified that error appears in the above-identified patent and that said Letters Patent is hereby corrected as shown below:

On Title Page, Item (74), replace "Turie A. Schwartz" with --Iurie A. Schwartz--.

Signed and Sealed this

Twenty-seventh Day of February, 2007

JON W. DUDAS
*Director of the United States Patent and Trademark Office*